United States Patent [19]

Watanabe

[11] 4,123,065
[45] Oct. 31, 1978

[54] PHONOGRAPH FOR USE WITH RECORD CARTRIDGES

[75] Inventor: Katsumi Watanabe, Kawasaki, Japan

[73] Assignee: Yugen Kaisha Watanabe Kenkyusho, Kanagawa, Japan

[21] Appl. No.: 787,446

[22] Filed: Apr. 14, 1977

[30] Foreign Application Priority Data

Aug. 21, 1976 [JP] Japan .............................. 51-100033

[51] Int. Cl.² ............................ G11B 3/40; G11B 3/04
[52] U.S. Cl. ..................................... 274/9 B; 274/9 C
[58] Field of Search ............... 274/1 A, 9 R, 9 B, 9 C

[56] References Cited

U.S. PATENT DOCUMENTS

| 3,648,385 | 3/1972 | Barlow et al. | 274/9 B |
| 3,740,056 | 6/1973 | Nuttall et al. | 274/1 A |
| 3,773,331 | 11/1973 | Watanabe | 274/1 A |
| 3,811,686 | 5/1974 | Watanabe | 274/9 C |
| 3,825,268 | 7/1974 | Holland et al. | 274/9 C |

Primary Examiner—Steven L. Stephan
Attorney, Agent, or Firm—Basile and Weintraub

[57] ABSTRACT

A phonograph for use with a record cartridge wherein a disc record is attached to a sheet-like record holder, comprises a cartridge holder mounted on a casing for immovably holding the record cartridge with its record facing downwardly. Within the casing, a motor-driven turntable is rotatably mounted under the cartridge holder, and a speaker cone is mounted further under the turntable in concentric, back-to-back relationship for simultaneous rotation therewith. A tone arm pivoted eccentrically on the turntable has a reproducing stylus extending upwardly therefrom for engagement with a record groove of the record cartridge. The vibrations set up in the reproducing stylus during rotation of the turntable relative to the record cartridge are transmitted to the speaker cone via a vibration transmitter rod mounted on the turntable.

6 Claims, 5 Drawing Figures

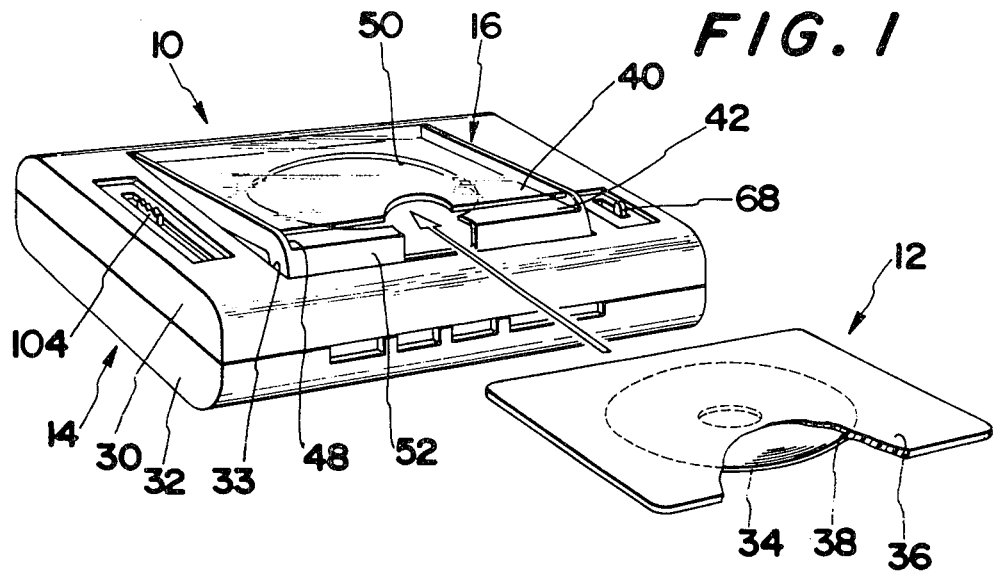
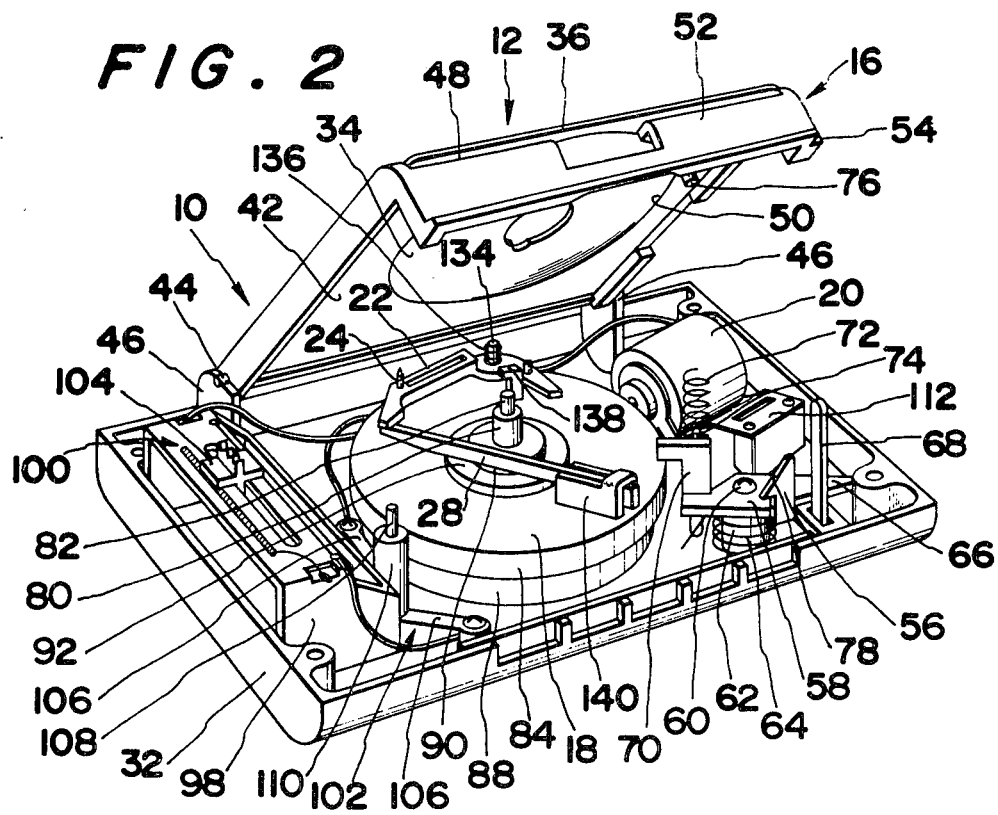

PHONOGRAPH FOR USE WITH RECORD CARTRIDGES

BACKGROUND OF THE INVENTION

1. Field of the Invention

This invention relates to sound reproducing apparatus, and more specifically to a phonograph of the type wherein mechanical vibrations set up in a reproducing stylus by the undulations of a record groove are transmitted directly (i.e., without the process of electrical amplification) to a speaker diaphragm, causing same to generate audible vibrations of the air. Still more specifically, the present invention deals with such a phonograph for particular use with what are herein termed "record cartridges", by which are meant sheet-like holders having disc records attached thereo, but with no unnecessary limitations thereto being intended.

2. Description of the Prior Art

There have been proposed several phonographs of the type for use with record cartridges, among them being Japanese Patent Application No. 46-31762 and Japanese Utility Model Application No. 49-46395. Such prior art devices are mostly unnecessarily complex in construction, difficult of manufacture or assemblage, expensive, and not sufficiently durable. These drawbacks are overcome, to some extent, in Japanese Utility Model Application No. 47-80766 (Publication No. 51-31612).

According to the last mentioned application, however, a speaker cone is mounted eccentrically on a turntable and makes direct sliding contact with a tone arm for receiving therefrom the sound-producing vibrations of a stylus. This arrangement makes the phonograph bulky in size. Furthermore, during rotation of the turntable, the speaker cone mounted eccentrically thereon can be thought of as periodically moving toward and away from the listener, so that the quality of the sound reproduced is adversely affected by the Doppler effect.

The eccentric arrangement of the speaker cone with respect to the turntable has an additional disadvantage arising from the fact that the center of gravity of the turntable-and-cone assembly is out of register with the axis of rotation of the turntable. As a consequence, it is difficult to hold the stylus on the tone arm, which is pivotally mounted on the turntable, in correct engagement with the spiral sound groove of the record cartridge throughout the course of playback, so that the sound stored in the record groove may not be reproduced correctly. The useful life of the phonograph itself may also be substantially shortened.

SUMMARY OF THE INVENTION

It is an object of this invention to provide an improved sound reproducing apparatus for use with record cartridges or the like, which is materially simplified, compact, and durable in construction and which is easy to manufacture or assemble.

Another object of this invention is to provide a sound reproducing apparatus which has improved playback quality.

A further object of this invention is to provide a sound reproducing apparatus wherein a reproducing stylus can be positively maintained in correct engagement with the record groove throughout the course of playback.

A still further object of this invention is to provide a sound reproducing apparatus wherein the vibrations of a drive motor are effectively isolated from the casing, resulting in minimum noise production during playback.

Briefly stated, the sound reproducing apparatus in accordance with the present invention includes a cartridge holder mounted on a casing for immovably holding a record cartridge with its record facing downwardly. Within the casing a turntable is mounted under the cartridge holder for rotation about a vertical axis passing the center of the record of the record cartridge held in position by the holder. A speaker means is mounted under the turntable in concentric, back-to-back relationship for joint rotation therewith. Pivoted eccentrically on the turntable is a tone arm which has a reproducing stylus thereon for engaging the record and for receiving sound-producing vibrations therefrom during turntable rotation relative to the record cartridge. The apparatus further includes means for transmitting the vibrations of the reproducing stylus to the speaker means.

The sound reproducing apparatus of the foregoing broad outline is perhaps best characterized by the concentric, back-to-back arrangement of the turntable and the speaker means, with the latter comprising a speaker cone and an armature integrally connected thereto in a preferred embodiment of my invention. The concentric turntable-and-speaker arrangement results in the substantial simplification of the overall construction of the apparatus and in the substantial reduction of its size. Furthermore, the reproducing stylus can be maintained in positive engagement with the record groove during the rotation of the turntable-and-speaker assembly relative to the record cartridge, and the assembly gives rise to no Doppler effect which would adversely affect the quality of the sound reproduced.

As an additional advantage of the back-to-back arrangement of the turntable and the speaker cone, there is created therebetween a sound chamber effective to improve the sonority of the apparatus. In the preferred embodiment, the speaker cone is supported by the turntable via a skirt formed integral with the latter and connected to the periphery of the speaker cone, so that the sound chamber is substantially completely enclosed.

The above and other objects, features and advantages of the present invention and the manner of attaining them will become more clearly apparent, and the invention itself will be best understood, from the following description of the preferred embodiment with reference had to the accompanying drawings.

BRIEF DESCRIPTION OF THE DRAWINGS

FIG. 1 is a perspective view of the phonograph constructed in accordance with the invention, and a record cartridge suitable for use with the phonograph, with the record cartridge being shown partly broken away and with the cartridge holder of the phonograph held in a half-closed position for receiving the record cartridge;

FIG. 2 is a perspective view showing the phonograph of FIG. 1 with the top half of its casing removed and the cartridge holder widely open to clearly reveal the inner details of the casing;

DESCRIPTION OF THE PREFERRED EMBODIMENT

Figure 3:
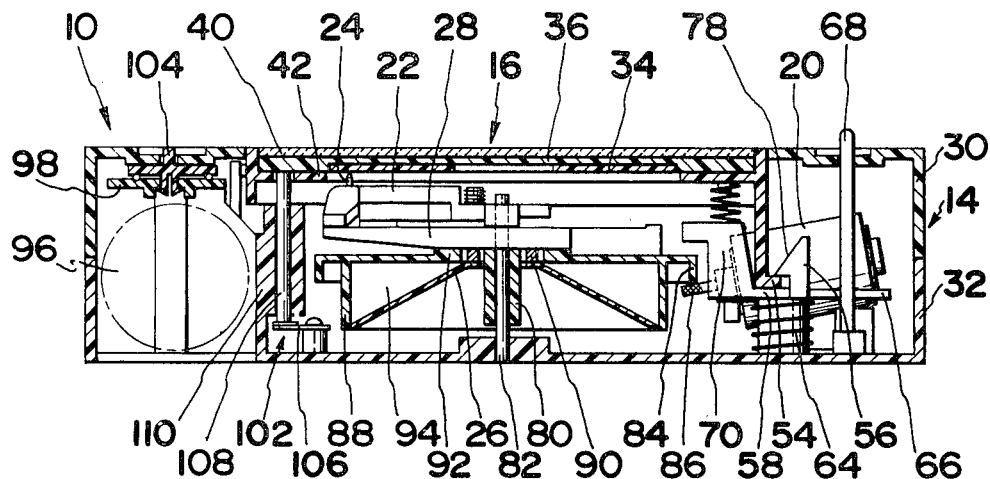
FIG. 3 is a vertical sectional view of the phonograph of FIGS. 1 and 2, with the phonograph being shown sectioned in substantially two different planes.

A preferred form of the phonograph in accordance with the present invention is shown in its entirety and generally designated 10 in FIG. 1 of the accompanying drawings, which also illustrates a record cartridge 12 suitable for use with the phonograph. It will be seen from FIG. 1 that the phonograph 10 comprises a boxlike casing 14 and a cartridge holder 16 pivotally mounted thereon for immovably but replaceably holding the record cartridge 12.

As will be seen from FIGS. 2 and 3, the phonograph 10 further comprises, broadly, a turntable 18 rotatably mounted within the casing 14, a drive motor 20 for imparting rotation to the turntable, a tone arm 22 pivotally supported in an eccentric position on the turntable, a reproducing stylus 24 extending upwardly from the tone arm for receiving sound-producing vibrations from the record cartridge 12 a speaker diaphragm or cone 26 mounted under the turntable in concentric, back-to-back relationship thereto, and a vibration transmitter rod 28 substantially pivotally mounted on the turntable for transmitting the vibrations of the stylus to the speaker cone.

With reference back to FIG. 1, the casing 14 of the phonograph 10 comprises a top half 30 and a bottom half 32 which can be both molded of synthetic resinous material and which are suitably fastened together. The casing top half 30 has formed therein a rectangular opening 33 in which the cartridge holder 16 is mounted in the manner described later.

The record cartridge 12 also shown in FIG. 1 is, in effect, a substantially integral assembly of a disc record 34 and a record holder 36. The record holder 36 is shown as a rectangular sheet of plastics or other material. One of the faces of this record holder has a circular depression 38 formed centrally therein, and the disc record 34 is undetachably fitted in the circular depression, with the grooved face of the record directed away from the record holder. An adhesive may be used for securing the disc record 34 to the record holder 36. Preferably, the other face of the record holder 36 (i.e., the one opposite to its record carrying face) may have printed or otherwise marked thereon any suitable visual information pertaining to the audio information stored on the record 34.

As will be seen from FIGS. 1 through 3, the cartridge holder 16 comprises a top plate 40 and a bottom plate 42 which are disposed in spaced parallelism and which are integrally molded of synthetic resinous material. The cartridge holder 16 has a pair of trunnions 44 (one seen in FIG. 2) formed at or adjacent its rear end, one on each side thereof, and these trunnions are each rotatably supported by one of a pair of bearings 46 which can be molded integral with the casing bottom half 32.

Formed in the front, free end of the cartridge holder 16 is a slot 48 through which the record cartridge 12 is to be slid into and out of the space between the top and bottom plates 40 and 42 of the cartridge holder, with the record 34 of the cartridge facing downwardly. It will be observed from FIG. 3 that the space bounded by the cartridge holder 16 is shaped and sized to suit the record cartridge 12 so that the latter may be immovably retained therein. The bottom plate 42 of the cartridge holder is centrally open at 50 to permit the stylus 24 on the tone arm 22 to engage the usual spiral sound groove of the disc record 34 when the cartridge holder is fully closed as shown in FIG. 3.

The cartridge holder 16 is formed to include a downturned flange 52 at its front end which is received within the casing 14 when the cartridge holder is closed. The flange 52 is complete with a ledge 54 which is to move into and out of engagement with an upstanding hook 56 integrally connected to a swivel arm 58 which is pivoted at 60 on a column 62 for pivotal movement in a horizontal plane. The swivel arm 58 together with the hook 56 is biased to turn clockwise, as viewed in FIG. 2, by a torsion spring 64 coiled around the column 62.

The swivel arm 58 is formed to include an abutment 66 which is urged by the torsion spring 64 against an ejector lever 68 pivotally mounted on the bottom of the casing 14. Also formed integral with the swivel arm 58 is an inverted L-shaped limit stop 70 which overhangs the turntable 18 to limit its upward motion, as will be explained later in further detail. A helical compression spring seen at 72 in FIG. 2 is anchored at its bottom end to a boss 74 on the bottom of the casing 14 and may be suitably affixed at its top end to a boss 76 projecting downwardly from the bottom plate 42 of the cartridge holder 16.

Thus, upon manual depression of the free or front end of the cartridge holder 16 against the force of the compression spring 72, the ledge 54 of the cartridge holder slides down a sloping edge 78 of the hook 56 thereby causing the swivel arm 58 to turn counterclockwise against the bias of the torsion spring 64. The hook 56 is urged by the torsion spring 64 into positive engagement with the ledge 54 when the cartridge holder 16 is disposed flush with the casing top half 30 as shown in FIG. 3, so that the cartridge holder 16 can be held fully closed in spite of the upward force of the compression spring 72.

It should be understood that the cartridge holder 16 is shown widely open in FIG. 2 merely to reveal the inner details of the casing 14. In the normal use of this phonograph 10, the cartridge holder is to be pivoted between the half-closed or "eject" position shown in FIG. 1 and the fully closed or "playback" position shown in FIG. 3. The record cartridge 12 may be inserted into the cartridge holder 16 when the latter is in the half-closed position of FIG. 1. As the cartridge holder is subsequently depressed to and locked in the fully closed position of FIG. 3, the turntable 18 will be automatically set in rotation to commence playback of the record cartridge, as will be more fully described hereinbelow.

Upon completion of playback, the tip of the ejector lever 68, projecting upwardly of the casing top half 30 as shown in FIGS. 1 and 3, may be pressed rearwardly to move the hook 56 out of engagement with the cartridge holder ledge 54 via the abutment 66 against the bias of the torsion spring 64. Thereupon the cartridge holder 16 will pop up to the half-closed position under the force of the compression spring 72, ready for withdrawal of the record cartridge 12 therefrom.

Preferably, at least the top plate 40 of the cartridge holder 16 should be molded of transparent material, in order that the user may be enabled simultaneously to see the visual information on the top face of the record cartridge 12 and to listen to the audio information being played back by the phonograph 10. In this manner the phonograph in accordance with my invention can be employed for audiovisual education or like purposes.

With reference to both FIGS. 2 and 3, the turntable 18 is molded integral with a sleeve 80 located centrally thereof. This sleeve is slidably fitted over a spindle 82 fixedly erected on the bottom of the casing 14, so that the turntable 18 is both rotatable and movable up and down relative to the spindle. The spindle 82 is disposed in vertical alignment with the center of the disc record 34 of the record cartridge held in position within the cartridge holder 16 in its fully closed position. FIG. 3 shows the turntable 18 together with the sleeve 80 raised off the bottom of the casing 14. This is because a rim 84 of the turntable bears against a knurled output shaft 86 of the drive motor 20, for purposes that will be made apparent presently.

FIG. 3 also clearly illustrates the speaker cone or diaphragm 26 disposed under the turntable 18 in concentric, back-to-back relationship. The speaker cone 26 has its periphery secured, as by use of an adhesive, to the bottom edge of a skirt 88 in the shape of a hollow cylinder molded integral with and disposed concentrically under the turntable 18. The speaker cone 26 is therefore both rotatable and movable up and down with the turntable 18.

An armature 90 in the shape of a hollow cylinder is integrally mounted on the top end of the speaker cone 26. This armature surrounds the sleeve 80 with substantial clearance and is received, also with substantial clearance, in a hollow, stepped boss 92 formed centrally of the turntable 18 and directly connected to the sleeve 80. As will be noted from FIG. 2, the stepped boss 92 of the turntable is apertured to partly expose the top of the armature 90. Resting on this exposed top of the armature 90 is the vibration transmitter rod 28 for transmitting the vibrations of the stylus 24 to the armature and thence to the speaker cone 26.

As clearly shown in FIG. 3, the concentric, back-to-back arrangement of the turntable 18 and the speaker cone 26 in accordance with my invention results, as one of its advantages, in the formation of a sound chamber or space 94 which functions as the sound box to enhance the sonority of the phonograph 10. This objective can be attained to some extent only if the turntable and speaker cone are arranged back to back in accordance with this invention. The provision of the turntable skirt 88 is preferable, however, because it serves the dual purpose of enclosing the sound chamber 94 and securing the speaker cone 26 to the turntable 18.

The drive motor 20 for imparting rotation to the turntable 18 is powered from a battery 96, usually a dry cell or cells, that is housed in a battery magazine 98 formed on the bottom of the casing 14. It will be observed from FIG. 2 in particular that the battery 96 is electrically connected to the drive motor 20 via a variable resistor 100 mounted on the battery magazone and an on-off switch 102 on the bottom of the casing.

The variable resistor 100 has a slide 104 movable back and forth along a linear guide slot formed in the battery magazine 98. As best shown in FIG. 1, the slide 104 can be manipulated from without the casing for adjustably varying the resistance value of the variable resistor 100 and hence the speed of the drive motor 20.

The on-off switch 102 comprises a pair of contacts 106 and an upstanding actuator pin 108, with the latter being slidably supported by a sleeve 110 integral with the battery magazine 98 for moving the pair of swtich contacts into and out of engagement with each other. The pair of switch contacts 106 are, in fact, cantilever springs which are self-biased so as to be out of engagement with each other.

As will be apparent from FIG. 3, the switch actuator pin 108 is adapted to be depressed to move the pair of switch contacts 106 into engagement with each other when the cartridge holder 16 is depressed to the fully closed position. The drive motor 20 is therefore automatically set in operation when the cartridge holder is depressed to the fully closed position of FIG. 3, and is automatically set out of operation when the cartridge holder is raised to the half-closed position of FIG. 1 by manipulation of the ejector lever 68.

The drive motor 20 is mounted on a resilient means, such as resilient mount 112 adapted to afford firm frictional engagement of its knurled output shaft 86 with the turntable rim 84 in driving relationship and further to urge the turntable 18 upwardly. The consequent upward motion of the turntable 18 relative to the spindle 82 is limited by the aforesaid stop 70 formed integral with the swivel arm 58.

Figure 4:
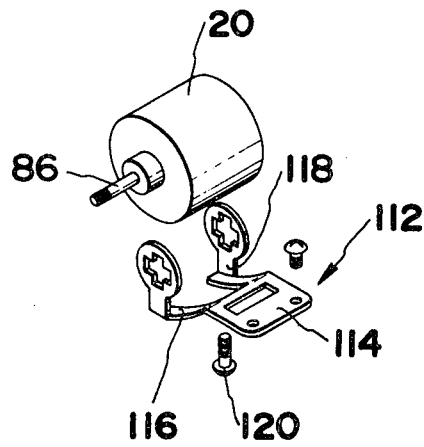
FIG. 4 is an exploded perspective view of the drive motor and its resilient mount used in the phonograph of FIGS. 1 through 3.

As illustrated in greater detail in FIG. 4, the resilient motor mount 112 is a sheet metal punching comprising a flat portion 114 to be screwed or otherwise fastened to a suitable stationary part of the phonograph 10, a pair of arms 116 extending from the flat portion in parallel spaced relationship, and a pair of stems 118 angled upwardly from the distal ends of the respective arms and having enlarged heads for holding the drive motor 20 therebetween. It will be apparent that the resilient motor mount 112 functions as a cantilever spring. Shown at 120 is an adjusting screw which projects into the casing 14 from under its bottom into abutting contact with the resilient motor mount 112 for adjustably varying the upward force exerted on the turntable 18 via the motor output shaft 86.

With the turntable 18 thus urged upwardly by the resilient motor mount 112, the stylus 24 on the tone arm 22 pivoted on the turntable can be held in positive engagement with the record groove of the record cartridge 12 within the cartridge holder 16 when the latter is in the fully closed position, as will be apparent from a consideration of FIG. 3. The resilient motor mount 112 has the additional advantage of isolating the vibrations of the drive motor from the casing, resulting in substantial reduction of the noise produced by the phonograph during playback.

Figure 5:
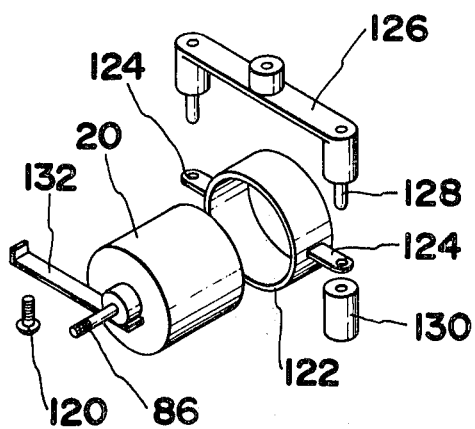
FIG. 5 is an exploded perspective view showing the drive motor together with means alternative to the resilient mount of FIG. 4.

FIG. 5 illustrates means that can be employed in lieu of the resilient motor mount 112. The alternative means include a motor holder 122 in the shape of a hollow cylinder complete with a pair of lugs 124, which is integrally molded of rubber or like elastic material. Closely fitted over the drive motor 20, the motor holder 122 is to be supported in position by an inverted U-shaped clamp 126 of rigid plastics or the like. The clamp 126 has a pair of pins 128, preferably of metal, that are intended to be inserted respectively into and through the holes formed in the motor holder lugs 124 and thence into a pair of sockets 130 (one seen).

The alternative means of FIG. 5 are advantageous in that the vibrations of the drive motor 20 can be damped by the elastic motor holder 122 more efficiently than by the resilient motor mount 112 of FIG. 4. However, the alternative means necessitate the provision of a separate cantilever spring 132 for urging the motor output shaft 86 against the turntable rim 84. In this case, too, the adjusting screw 120 should preferably be provided for adjustably varying the force exerted on the turntable 18 by the cantilever spring 132 via the motor output shaft 86.

Referring again to FIGS. 2 and 3, the tone arm 22 having the upstanding stylus 24 fixedly mounted thereon is pivotally supported at one end by a pin 134 on the turntable 18. A torsion spring 136 coiled around the pivot pin 134 is adapted to bias the tone arm 22 to pivot outwardly, that is, away from the turntable spindle 82. A stop 138 on the turntable 18 limits the outward movement of the tone arm 22 in its starting position at the perimeter of the disc record 34 of the record cartridge held in position within the cartridge holder 16. Thus, when the cartridge holder is raised to the half-closed position of FIG. 1 upon completion of each playback, the tone arm 22 together with the stylus 24 thereon automatically returns to the starting position under the bias of the return spring 136.

Also mounted on the turntable 18 is the vibration transmitter rod 28 which is substantially pivotally supported at one end by a bracket 140 secured to the turntable. The vibration transmitter rod 28 rests, at a point intermediate both ends thereof, on the top of the speaker armature 90 partly exposed out of the aperture in the turntable boss 92, as mentioned previously. The free end of the tone arm 22 rests on the vibration transmitter rod 28 for sliding movement, during playback, from the other end of the vibration transmitter rod close to its point of contact with the speaker armature 90.

Thus, the vibrations set up in the stylus 24 by the undulations of the record groove during playback are transmitted to the vibration transmitter rod 28 via the tone arm 22, and thence directly to the speaker armature 90, thereby causing the speaker cone 26 to generate audible sound. In order for the vibration transmitter rod 28 to perform its intended function to the full, it is essential, or at least desirable, that the rod be made of metal such as aluminum which does not easily absorb vibrations.

OPERATION

Although the operation of the phonograph 10 is believed clearly apparent from the foregoing description, further amplification will be made in the following brief summary of such operation. For insertion of the record cartridge 12 into the cartridge holder 16, the ejector level 68 may be pressed rearwardly to move the hook 56 out of engagement with the cartridge holder ledge 54 against the bias of the torsion spring 64, whereupon the cartridge holder will pop up to half-closed position of FIG. 1 under the bias of the compression spring 72.

The cartridge 12 may then be inserted, with its disc record 34 facing downward, into the cartridge holder 16 through its slot. Upon full insertion of the cartridge into the cartridge holder, the latter may be depressed against the bias of the compression spring 72 until the holder is locked in the fully closed position of FIG. 3 by the hook 56. The stylus 24 on the tone arm 22, which has been in its starting position as shown in FIG. 2, will be urged against the disc record 34 of the cartridge and will engage its spiral sound groove at the record perimeter upon full closure of the cartridge holder, since the turntable 18 supporting the tone arm thereon is urged upwardly by the resilient motor mount 112 via the motor output shaft 86.

As will be apparent from FIG. 3, the depression of the cartridge holder to its fully closed position results also in the closure of the on-off switch 102 by the switch actuator pin 108. The drive motor 20 is therefore set in motion immediately upon full closure of the cartridge holder, imparting rotation to the turntable 18 via its knurled output shaft 86 which is in frictional contact with the turntable rim 84. The turntable rotates about the spindle 82 together with the tone arm 22, the speaker cone 26 and the vibration transmitter rod 28.

With the rotation of the turntable 18, the stylus 24 on the tone arm 22 will follow the spiral sound groove of the disc record substantially radially inwardly toward its center against the bias of the return spring 136. The vibrations imparted to the stylus by the undulations of the record groove are transmitted to the speaker cone 26 via the tone arm 22, the vibration transmitter rod 28 and the speaker armature 90, so that the information stored on the record cartridge is reproduced as the audible vibrations of the air generated by the speaker cone.

Upon completion of playback, the ejector lever 68 may again be pressed rearwardly to cause the cartridge holder 16 to pop up to the half-closed position. The on-off switch 102 will then be opened automatically to set the drive motor out of motion, since the pair of switch contacts 106 are self-biased so as to be out of engagement with each other. Simultaneously, with the stylus being disengaged from the record groove, the tone arm will automatically return to the starting position under the bias of the return spring 136. The foregoing procedure may be repeated for playback of successive record cartridges similar to the one shown at 12 in FIG. 1.

Although it has shown and described what is consider a preferred form of an improved sound reproducing apparatus. It should be understood that the present invention is not to be limited by the exact details of this disclosure. It should also recognize that the sound reproducing apparatus lends itself for use with, instead of the record cartridge shown in FIG. 1, a record wherein a spiral sound groove is cut directly on a rectangular sheet of suitable material. It is therefore appropriate that the present invention be construed broadly and in a manner consistent with the fair meaning or proper scope of the following claims.

I claim:

1. A sound reproducing apparatus for particular use with record cartridges of the type each having a phonograph record on a sheet-like record holder, comprising in combination:

a casing;

a cartridge holder mounted on said casing for pivotal movement between a first position for receiving a record cartridge and a second position for immovably holding the record cartridge with its record facing downwardly;

an upstanding spindle fixedly mounted within said casing and disposed in vertical register with the center of the record when said cartridge holder is in said second position;

a turntable mounted on said spindle so as to be both rotatable and movable up and down relative to same;

there being an aperture in said turntable;

a drive motor having an output shaft underlying the periphery of said turntable;

resilient means urging at least said output shaft of said drive motor upwardly into engagement with said turntable thereby urging said turntable upwardly;

a tone arm pivotally supported at one end in an eccentric position on said turntable;

a reproducing stylus extending upwardly from said tone arm so as to be urged by said resilient means into engagement with a record groove of the record cartridge when said cartridge holder is in said second position, said output shaft of said drive motor being held in frictional contact with the periphery of said turntable in driving relationship when said cartridge holder is in said second position;

a speaker cone mounted under said turntable for simultaneous rotation therewith, said speaker cone being disposed in concentric, back-to-back relationship to said turntable;

an armature connected to said speaker cone, said armature being at least partly exposed through said aperture in said turntable; and a vibration transmitter rod substantially pivotally supported at one end on said turntable and resting at a point intermediate both ends thereof on said armature exposed through said aperture in said turntable, said tone arm resting at its free end on said vibration transmitter rod for sliding movement, during playback, from the other end of said vibration transmitter rod toward its point of contact with said armature.

2. The sound reproducing apparatus as defined in claim 1, wherein said turntable is adapted to define between itself and said speaker cone a sound chamber effective to improve the sonority of the sound reproducing apparatus.

3. The sound reproducing apparatus as defined in claim 2, wherein said turntable has a skirt extending downwardly therefrom and connected to the periphery of said speaker cone, whereby said sound chamber is substantially completely enclosed.

4. The sound reproducing apparatus as defined in claim 1, wherein the vibrations of said reproducing stylus are transmitted to said speaker means via said tone arm and said vibration transmitter rod.

5. A sound reproducing apparatus as set forth in claim 1, wherein said resilient means is a mount of resilient material cantilevered within said casing and having said drive motor mounted thereon, said mount being also effective to isolate the vibrations of said drive motor from said casing.

6. A sound reproducing apparatus as set forth in claim 1, further comprising a motor holder of elastic material holding said drive motor, said motor holder being adapted to isolate the vibrations of said drive motor from said casing.

* * * * *